(12) United States Patent
Lin et al.

(10) Patent No.: US 8,364,613 B1
(45) Date of Patent: Jan. 29, 2013

(54) HOSTING PREDICTIVE MODELS

(75) Inventors: Wei-Hao Lin, New York, NY (US);
Travis H. Green, New York, NY (US);
Robert Kaplow, New York, NY (US);
Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 13/246,596

(22) Filed: Sep. 27, 2011

Related U.S. Application Data

(60) Provisional application No. 61/507,868, filed on Jul. 14, 2011.

(51) Int. Cl.
*G06F 15/18* (2006.01)
*G06N 3/00* (2006.01)

(52) U.S. Cl. .............................. 706/12; 705/165; 700/65

(58) Field of Classification Search ................ 706/12
See application file for complete search history.

(56) References Cited

U.S. PATENT DOCUMENTS

| | | | |
|---|---|---|---|
| 5,271,088 A | 12/1993 | Bahler | |
| 6,243,696 B1 | 6/2001 | Keeler et al. | |
| 6,778,959 B1 | 8/2004 | Wu et al. | |
| 6,879,971 B1 | 4/2005 | Keeler et al. | |
| 6,920,458 B1 | 7/2005 | Chu et al. | |
| 7,010,696 B1 | 3/2006 | Cambridge et al. | |
| 7,054,847 B2 | 5/2006 | Hartman et al. | |
| 7,194,395 B2 | 3/2007 | Genovese | |
| 7,349,919 B2 | 3/2008 | Russell et al. | |
| 7,565,304 B2 | 7/2009 | Casati et al. | |
| 7,590,589 B2 | 9/2009 | Hoffberg | |
| 7,606,924 B2 | 10/2009 | Raz et al. | |
| 7,650,331 B1 | 1/2010 | Dean et al. | |
| 7,668,740 B1 | 2/2010 | Baggett et al. | |
| 7,689,520 B2 | 3/2010 | Burges et al. | |
| 7,788,195 B1 | 8/2010 | Subramanian et al. | |
| 7,813,870 B2 | 10/2010 | Downs et al. | |
| 7,813,944 B1 | 10/2010 | Luk et al. | |
| 7,899,611 B2 | 3/2011 | Downs et al. | |

(Continued)

OTHER PUBLICATIONS

Duchi, John, et al., "Boosting with Structural Sparsity", 2009, cs.berkeley.edu [online]. [Retrieved on Nov. 25, 2011]. Retrieved from the Internet: <URL: http://www.cs.berkeley.edu/~jduchi/projects/DuchiSi09d.pdf>, 41 pages.

(Continued)

*Primary Examiner* — Kakali Chaki
*Assistant Examiner* — Kalpana Bharadwaj
(74) *Attorney, Agent, or Firm* — Fish & Richardson P.C.

(57) ABSTRACT

Methods include the actions of storing a first predictive model in computer-readable memory, the first predictive model having been defined based on a first training dataset provided by an owner of the first predictive model and being operable to generate an output based on a query, enabling access to the first predictive model based on permissions defined by the owner, while inhibiting access to the first training dataset, receiving a second training dataset from a user, the second training dataset being distinct from the first training dataset, modifying the first predictive model based on the second training dataset to provide a second predictive model, storing the second predictive model in computer-readable memory, and enabling access to the second predictive model.

20 Claims, 6 Drawing Sheets

U.S. PATENT DOCUMENTS

| | | | |
|---|---|---|---|
| 7,912,628 | B2 | 3/2011 | Chapman et al. |
| 7,930,266 | B2 | 4/2011 | Tuv et al. |
| 7,970,721 | B2 | 6/2011 | Leskovec et al. |
| 7,979,365 | B2 | 7/2011 | Goldberg et al. |
| 8,027,854 | B2 | 9/2011 | Baggett et al. |
| 8,065,073 | B2 | 11/2011 | Downs et al. |
| 8,065,659 | B1 | 11/2011 | Prince et al. |
| 8,090,524 | B2 | 1/2012 | Chapman et al. |
| 2002/0099730 | A1 | 7/2002 | Brown et al. |
| 2003/0212851 | A1 | 11/2003 | Drescher et al. |
| 2005/0234753 | A1 | 10/2005 | Pinto et al. |
| 2007/0005311 | A1 | 1/2007 | Wegerich et al. |
| 2007/0150424 | A1 | 6/2007 | Igelnik |
| 2008/0097937 | A1 | 4/2008 | Hadjarian |
| 2008/0154821 | A1* | 6/2008 | Poulin .......................... 706/21 |
| 2008/0270363 | A1 | 10/2008 | Hunt et al. |
| 2008/0288209 | A1 | 11/2008 | Hunt et al. |
| 2008/0288889 | A1 | 11/2008 | Hunt et al. |
| 2008/0294372 | A1 | 11/2008 | Hunt et al. |
| 2008/0294996 | A1 | 11/2008 | Hunt et al. |
| 2008/0319829 | A1 | 12/2008 | Hunt et al. |
| 2009/0006156 | A1 | 1/2009 | Hunt et al. |
| 2009/0018996 | A1 | 1/2009 | Hunt et al. |
| 2009/0106178 | A1 | 4/2009 | Chu |
| 2010/0049538 | A1 | 2/2010 | Frazer et al. |
| 2011/0145175 | A1 | 6/2011 | Agarwal |
| 2011/0289025 | A1 | 11/2011 | Yan et al. |
| 2011/0313900 | A1* | 12/2011 | Falkenborg et al. ............ 705/30 |

OTHER PUBLICATIONS

Duchi, John, et al., "Boosting with Structural Sparsity", Proceedings of the 26th International Conference on Machine Learning, Montreal, Canada, 2009, cs.berkeley.edu [online]. [Retrieved on Nov. 25, 2011]. Retrieved from the Internet: <URL: http://www.cs.berkeley.edu/~jduchi/projects/DuchiSi09a.pdf>, 8 pages.

"Google Prediction API (Labs)", Google.com, [Retrieved on May 4, 2011]. Retrieved from the Internet: <URL: http://code.google.com/apis/predict/>, 21 pages.

R-Project web pages, [online] [retrieved on May 18, 2010]. Retrieved from the Internet: <URL: http://www.r-project.org/ >. 4 pages.

Uclassify web pages, 4 pages [online] [retrieved on May 18, 2010]. Retrieved from the Internet: <URL: http://www.uclassify.com/.

Zementis web pages, 6 pages [online] [retrieved on May 18, 2010]. Retrieved from the Internet: <URL: http://www.zementis.com/>, 34 pages.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Aug. 8, 2011]. Retrieved from the Internet: http://en.wikipedia.org/wiki/Active learning (machine learning), 3 pages.

Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL:http://ladisworkshop.org/sites/default/files/LADIS%202010%20actual.pdf>, 43 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL:marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., http://creativecommons.org., pp. 1-5.

Creative Commons Attribution-Share Alike 3.0 Unported, Winnow (algorithm)., http://creativecommons.org., 2 pages.

Bengio, Yoshua, Continuous Optimization of Hyper-Parameters, C.P. 6128 Succ. Centre-Ville, Montreal, Quebec, Canada, H3C 3J7, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

R. Duin, "The Combining Classifer: To Train or Not to Train?", IEEE Pattern Recognition, 2002 Proceedings, 16 International Conference, pp. 765-770.

L. Denoyer et al., "Structured Multimedia Document Classification", ACM DocEng '03, Nov. 20-22, 2003, pp. 153-160.

J. Platt et a., "Large Margin DAGs for Multiclass Classification", in Advances in Neural Information Processing Systems, S.A. Solla et al., eds., MIT Press 2000, pp. 1-7.

Potrera, Cosmin Marian, et al.; DCFMS: "A chunk-based distributed file system for supporting multimedia communication", Computer Science and Information (FedCSIS), 2011 Federated Conference on Publication Year: 2011, pp. 737-741.

McDermott, et al.: "Generating models of mental retardation from data with machine learning"; Knowledge and Data Engineering Exchange Workshop, 1997. Proceedings Digital Object Identifier: 10,1109/KDEX.1997.629850 Publication Year: 1997, pp. 114-119.

English, et al.; "A grammatical approach to reducing the statistical sparsity of language models in natural domains", Acoustics, Speech, and Signal Processing, IEEE International Conference of ICASSO'86, vol. 11, Digital Object Identifier: 10.1109/CASSO.1986.1168955 Publication Year: 1986, pp. 1141-1144.

Altincay, et al.; Post-processing of Classifier Outputs in Multiple Classifier Systems:, 2002; Springer-Verlag Berlin Heidelberg; Lecture Notes in Computer Science, 2002, vol. 2364; pp. 159-168.

Altincay, et al.: "Why Does Output Normalization Create Problems in Multiple Classifier Systems?" 2002; IEEE; 16th International Conference on Pattern Recognition, Proceedings; vol. 2; pp. 775-778.

Stemmer, Georg et al.; "Comparison and Combination of Confidence Measures"; 2006; Springer-Vergal Berlin Heidelbreg; Lecture Notes in Computer Science 2006, vol. 2448; pp. 181-188.

Altincay, et al., "Undesirable Effects of Output Normalization in Multiple Classifier Systems", 2002; Elsevier Science B.V.; Pattern Recognition Letters 24 (2003); pp. 1163-1170.

Delany, et al., Generating Estimates of Classification Confidence for a Case-Based Spam Filter; 2005; Springer-Vergal Berlin Heidelberg; Lecture Notes in Computer Science, 2005, vol. 3620, pp. 177-190.

Dag Consistent Parallel Simpulation: A Predictable and Robust Conservative Algorithm, Wenton Cai et al.; Parallel and Distributed Simulation, 1997; Proceedings, 11th Workshop on Digital Object Identifier; 10.1109/PADS.1997.594604; pp. 178-181.

Stochastic Models for the Web Graph, Kumar, R. et al.; Foundations of Computer Science, 2000; Proceedings, 41st Annual Symposium on Digital Object Identifier; 11.1109/SFCS.2000.892065; pp. 57-65.

Explicit Modeling of Mode Transition Constraints for Model Predictive Control, Kobayashi, K. et al.; SICE Annual Conference, 2008 Digital Object Identifier: 10.1109/SICE.2008.4654911; pp. 1569-1574.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Predictive Dynamix Inc., Predictive Modeling Technology, Predictive Dynamix, Inc., 2003-2004, 5 pages.

Duin, P.W. Robert, et al., Experiments with Classifier Combining Rules, J. Kittler and F. Foli (Eds.): MCS 2000, LNCS 1857, pp. 16-29, 14 pages.

Barbieri, Maddalena Maria, et al., Optimal Predictive Model Selection, The Annals of Statistics, 2004, vol. 32, No. 3, 29 pages.

Yuan, Zheng et al., Combining Linear Progression Models: When and How? Dec. 2004, 27 pages.

Evaluating Predictive Models, 36-350, Data Mining, Principles of Data Mining, Chapter 7; Berk chapter 2, Oct. 26 and 28, 2001, 22 pages.

* cited by examiner

HOSTING PREDICTIVE MODELS

PRIORITY CLAIM

This application claims priority under 35 USC §119(e) to U.S. Patent Application Ser. No. 61/507,868, filed on Jul. 14, 2011, the entire contents of which are hereby incorporated by reference.

TECHNICAL FIELD

This specification relates to systems and methods for hosting predictive models.

BACKGROUND

Predictive modeling generally refers to techniques for extracting information from data to build a model that can predict an output from a given input. Predicting an output can include predicting future trends or behavior patterns, or performing sentiment analysis, to name a few examples. Various types of predictive models can be used to analyze data and generate predictive outputs. Examples of predictive models include Naive Bayes classifiers, k-nearest neighbor classifiers, support vector machines, and logistic regression techniques, for example. Typically, a predictive model is trained with training data that includes input data and output data that mirror the form of input data that will be entered into the predictive model and the desired predictive output, respectively. The amount of training data that can be required to train a predictive model can be large, e.g., in the order of gigabytes or terabytes. The number of different types of predictive models available is extensive, and different models behave differently depending on the type of input data. Additionally, a particular type of predictive model can be made to behave differently, for example, by adjusting the hyper-parameters or via feature induction or selection.

SUMMARY

In general, one aspect of the subject matter described in this specification can be embodied in methods that include the actions of storing a first predictive model in computer-readable memory, the first predictive model having been defined based on a first training dataset provided by an owner of the first predictive model and being operable to generate an output based on a query, enabling access to the first predictive model based on permissions defined by the owner, while inhibiting access to the first training dataset, receiving a second training dataset from a user, the second training dataset being distinct from the first training dataset, modifying the first predictive model based on the second training dataset to provide a second predictive model, storing the second predictive model in computer-readable memory, and enabling access to the second predictive model. Other embodiments of this aspect include corresponding systems, apparatus, and computer program products.

These and other embodiments can optionally include one or more of the following features: storing a first predictive model includes receiving the first predictive model from an owner; storing a first predictive model includes: receiving the first training dataset from an owner, and applying the first training dataset to a first machine learning algorithm to generate the first predictive model; the first training dataset includes a first set of training examples and the second training dataset includes a second set of training examples, the second set of training examples including at least one training example that is divergent from the first set of training examples; actions further include modifying the second training dataset by applying one or more favoring operations on the second training dataset; modifying the first predictive model includes generating a copy of the first predictive model, and updating the copy of the first predictive model; updating the copy of the first predictive model includes applying the second training dataset and the copy of the first predictive model to a second machine learning algorithm; the first predictive model includes an ensemble of combined predicted models, and wherein updating the copy of the first predictive model includes: applying the second training dataset to a second machine learning algorithm to generate a supplementary predictive model representative of the second training dataset, and incorporating the supplementary predictive model into the ensemble of combined predictive models; and updating the copy of the first predictive model includes: combining the first and second training datasets to form an updated training dataset, and applying the updated training dataset to a second machine learning algorithm.

Particular embodiments of the subject matter described in this specification can be implemented so as to realize one or more of the following advantages. Hosting predictive models can enable users to utilize predictive modeling techniques without investing substantial time, data, or other such resources. This can be especially advantageous when such commodities are not readily available to the user. Users can be further enabled to actively generate new predictive models for themselves based on the original hosted models as relevant data becomes available. Hosting predictive models can also enable users owners to leverage collected data, for example by providing predictive models trained on such data at cost to users, while exposing little or no proprietary or confidential information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
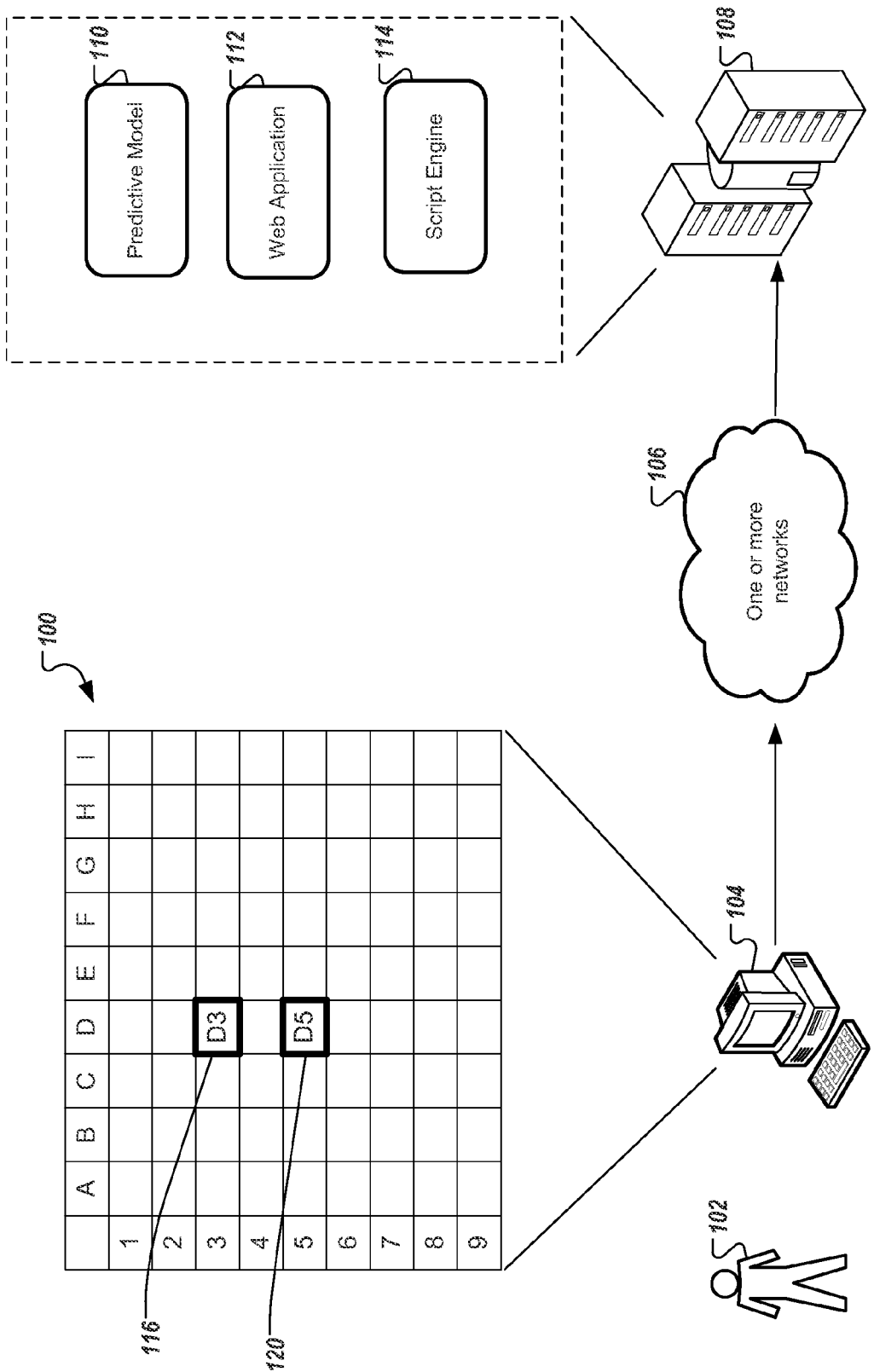
FIG. 1 illustrates use of the prediction API in conjunction with an example spreadsheet web application.

Generally, a predictive model can be considered logical or mathematical type construct operable to predict a future event or outcome based on historical facts or data. In some examples, a predictive model (or "model") is considered a categorical model if its predictive outcomes are categories. In some examples, a predictive model is considered a regression model if its predictive outcomes are numeric values. In some cases, the amount of data required to provide an accurate predictive model can be relatively large (for example, in the order of gigabytes or terabytes). Accordingly, pre-defined predictive models can be hosted such that users lacking sufficient historical data, or resources to collect such data, can utilize predictive techniques.

In some implementations, a predictive model can be constructed (or "trained") using a training dataset in conjunction with a machine learning algorithm. Training datasets can include a number of training examples embodying a patterned occurrence. Each training example can include a number of (i.e., one or more) observed features (e.g., numeric values or stings of text) related to a known outcome (e.g., a category or a numeric value). In some examples, the observed feature(s) for each training example can be considered a feature vector. The dimensionality of a feature vector can be equal to, or less than, the number of observed features included therein. In some implementations, feature vectors and associated outcomes of a training dataset can be organized in tabular form. For example, the training dataset illustrated by TABLE 1 includes of a number of training examples related to categorization of email messages as SPAM or NOT SPAM. As shown, the feature vector (which, in this example, includes a single observed feature) of each training example includes an email message subject line, and the related outcome is a category that indicates whether or not the email message is spam. In some examples, such training datasets can be stored in one of various suitable electronic data formats (e.g., comma-separated-values or "CSV", delimiter-separated values or "DSV", tab-separated values, as well as various markup and programming languages).

TABLE 1

| OBSERVED FEATURES | KNOWN OUTCOME |
|---|---|
| "You have won $$$" | "SPAM" |
| "Lose weight fast!" | "SPAM" |
| "Lowest interest rates ever!" | "SPAM" |
| "How are you?" | "NOT SPAM" |
| "Trip to New York" | "NOT SPAM" |

In some implementations, a training dataset can be applied to a selected machine learning algorithm to train a predictive model. More specifically, the machine learning algorithm can train a predictive model by systematically analyzing the applied training dataset and generating an inferred function that "fits" the training data. The trained predictive model can be representative of (or defined by) the training dataset and operable to map a feature vector to a predictive outcome according to the inferred function.

An inferred function fitted to a training dataset can include, for example, a mathematical function and/or a logical function. In some implementations, mathematical functions can be provided in the form of a continuous function, such as suitable polynomial functions, exponential functions, logarithms, etc. In some implementations, mathematical functions can be provided in the form of a discontinuous function, such as suitable piecewise functions, step functions, etc. Logical functions can also be provided in various suitable forms, such as two-valued logical functions (e.g., binary logic), fuzzy logical functions, Bayesian logical functions, etc.

As described above, a machine learning algorithm can include a number of ordered steps or operations for analyzing training data and generating a predictive model. In some implementations, a machine learning algorithm can be embodied by one or more computer programs operable to receive input and emit output. For example, the computer program(s) can include a number of instructions executable by a computer processor to perform one or more of the following operations: receive a training dataset stored in a suitable electronic data format; implement the machine learning algorithm to generate a predictive model that is representative of the training dataset; and output the predictive model in a suitable computer readable and executable format.

After a predictive model has been trained, queries can be submitted to the predictive model. In some implementations, queries can be similar in form to training examples: In some examples, a query can include a feature vector having the same (or fewer) observed features, but not include the related outcome. In response to a query, the predictive model can either determine the closest category for the submitted query (if it is a categorical model) or to estimate a value for the query (if it is a regression model), and return the predicted category or value.

In some implementations, a number of individual predictive models can be combined to form an ensemble. For example, output from the individual predictive models can be combined or integrated to achieve a more accurate prediction than can be provided by the individual models themselves. In some examples, output from the individual predictive models is combined according to a schema which can include one or more combining rules. Various types of combining rules can be provided, for example, fixed output and training combining rules. Fixed output combining rules can include one or more mathematical, logical, or statistical operations for comparing and/or integrating output from multiple predictive models. Trained combining rules can include one or more operations for aggregating output from multiple predictive models (i.e., first layer predictive models) to form an intermediate query. The intermediate query can then be posed to one or more second layer predictive models. The second layer predictive models can be capable of predicting an outcome based on predictions provided by the first layer predictive models.

In some implementations, machine learning algorithms can be used to update original (i.e., previously trained) predictive models. For example, updating-type machine learning algorithms can include a number of operations for analyzing additional training data as well as an original predictive model, and modifying or re-creating the predictive model in view of the additional data to provide an updated predicted model. In some implementations, modifying the original predictive model can include adjusting one or more parameters (e.g., hyper parameters of the inferred function) of the predictive model. Computer programs embodying such machine learning algorithms can be operable to: input previously trained predictive models and additional training data; implement the machine learning algorithm to generate an updated predictive model that is representative of the original training dataset and the additional training data; and output the updated predictive model in a suitable computer readable and executable format.

In some implementations, additional training data can be integrated or combined with an original training dataset (i.e., the training dataset used to train the original predictive model) to create an updated training dataset. The updated training dataset can be applied to a machine learning algorithm to generate an updated predictive model. In some examples, the updated training dataset can be modified and submitted in its modified form to the machine learning algorithm. For example, selected data within the updated training dataset can be "favored" over other data. In some examples, one or more bootstrapping operations can be applied to the updated training dataset. The bootstrapping operations can include assigning measures of accuracy or importance to respective training examples in the training dataset. For instance, training examples provided in the additional training data can be attributed a higher measure of importance than training examples provided in the original dataset. In this way, the updated predictive model can be biased towards more recent instances of the patterned occurrence. The opposite can be achieved by attributing a higher level of importance to training examples provided by the original dataset.

In some implementations, the original predictive model can be provided in the form of an ensemble included a plurality of individual predictive models. Output from the individual predictive models can be combined according to one or more fixed or trained combining rules, as described above. In some examples, an ensemble-type predictive model can be updated by using the additional training data to update at least one of the individual models included therein. In some examples, an ensemble-type predictive model can be updated by training a new predictive model using the additional training data and incorporating the new model into the ensemble. In some examples, output from the new predictive model can be weighted or devalued to bias the ensemble towards, or way from, training examples provided by the additional training dataset.

In some implementations, a computing system can be operable to train and/or maintain a number of predicted models on behalf of a user (e.g., an owner). For example, the computing system can receive a training dataset from an owner, and train a suitable predictive model (as described above) that is representative of the received training data. Such predictive models, as well as machine learning algorithms, can be stored in repositories that are accessible by other components (e.g., servers) of the computing system. In some examples, selected predicted models and/or machine learning algorithms can also be made accessible to a number of other users.

Access to predictive models and/or machine learning algorithms can be granted to users through web applications. A web application is software that executes on one or more server computing devices (or "servers") and that is accessed over a network such as the Internet by users through web browsers or other software that runs on client computing devices (or "clients"). User data files that are created, accessed, or modified by web applications are stored in repositories that are accessible to the servers. Web applications can provide a graphical user interface (GUI) to client devices by sending the client devices Hypertext Markup Language (HTML) documents or other information that can be used to render the GUIs.

A scripting language can enable users to control some or all aspects of web applications that recognize scripts written in the scripting language. In some examples, the scripting language is a selected type of computer programming language. A script can include a set of instructions that are written in the scripting language. In some implementations, the scripting language is JAVASCRIPT. Other scripting languages are also possible including functional and procedural programming languages. A script can be executed entirely on a client, entirely on a server, or on both the client and the server. In some implementations scripts are executed on one or more servers. Script execution can be initiated through explicit user invocation (e.g., selecting an interactive button in a GUI) or through web application activity (e.g., a spreadsheet web application that recalculates the value of a spreadsheet cell invokes a script that is referenced in a formula for the cell.)

In some implementations, the scripting language or a software library accessible from the scripting language provides a set of programmatic objects whose methods can be invoked in scripts to access functionality of web applications such as spreadsheets, word processors, email, financial tools, calendars, and maps, for example. (Alternatively, the functionality can be accessed through function or procedure calls rather than through method invocations.) By way of illustration, an object that represents a spreadsheet web application can have methods for reading, writing and creating spreadsheet data files, performing calculations on information in spreadsheet cells, and manipulating the spreadsheet GUI such as, for instance, by opening dialog boxes. Likewise, an object that represents an email web application can have methods for retrieving new email messages, sending email messages, moving email messages to data files and directories, and so on.

In addition to accessing web application functionality in scripts, a prediction API can be provided to enable scripts to programmatically train (e.g., via machine learning algorithms) and/or use predictive models. A prediction API can enable users to upload training datasets from web application data files (or from other sources of data) and use the uploaded datasets to train a predictive model. In some examples, users can also upload new or customized machine learning algorithms through the prediction API. A model that has been trained using uploaded training datasets, or a previously trained model, can be invoked by scripts to obtain predictions for queries.

TABLE 2 below shows an example set of prediction API functions. The prediction API functionality can be exposed in scripts as methods, functions, procedure calls, or macros.

TABLE 2

| PREDICTION API FUNCTION | DESCRIPTION |
|---|---|
| Invoke training | This function initiates training of a model by sending a request to a model training system (or other system). Input parameters of the function are identification of the model to train and the storage location of the training data. In some implementations, the identification of the model and the storage location of the training data are one in the same. In this case, only one input parameter needs to be provided to the function. The storage location can be a file directory path or other resource locator. In some implementations, the invoke training function is asynchronous which enables the script engine to continue execution of a script without waiting for the model training to complete. |
| Check training status | This function initiates a request to a model training system (or other system) to determine if model training has completed. Input parameters of the function are identification of the model to train and the storage location of the model's training data. In some implementations, the identification of the model and the storage location of the training data are one in the same. In this case, only one input parameter needs to be provided to the function. In some implementations, an additional input parameter of the function is the model type: classification or regression. If the model type is classification, a classification accuracy (e.g., a number between 0.0 and 1.0, where 1.0 is 100% accurate) can be specified as an additional input parameter for the function. The classification accuracy is an estimate, based on the amount and quality of the training data, of the estimated prediction accuracy. This can be used to decide whether the results are accurate enough to use the model for predictions. If the model type is regression, a mean squared error which is 0.0 or greater can be specified as an additional input parameter for the function. The mean squared error is the average of the square of the difference between the predicted and actual values. This is an estimate, based on the amount and quality of the training data, of the estimated prediction accuracy. This can be used to decide whether the results are accurate enough to use the model for predictions. |

TABLE 2-continued

| PREDICTION API FUNCTION | DESCRIPTION |
| --- | --- |
| Predict | This function requests a prediction from a model. Input parameters to the function are a query and identification of a model that will perform the prediction. For example, the query can specify a similar type of feature vector as a training example. In some implementations, the identification of the model is the storage location of the training data that was used to train the model. For a categorical model, the function returns one or more categories ("labels") and corresponding scores for the query. In some implementations, the label having the largest, most positive score is the most likely match. Alternatively, the function can return a single category that best fits the query. For a regression model, a predicted value for the query, calculated based on given values in the training data, is returned by the function. |
| Update | This function initiates updating of a previously trained model by sending a request to a model updating system (or other system). Input parameters of the function are identification of the previously trained model to update and the storage location of the new training data. In some implementations, the identification of the updatable model and the storage location of the new training data are one in the same. In this case, only one input parameter needs to be provided to the function. The storage location can be a file directory path or other resource locator. |
| Delete | This function deletes a model specified in the request. |

In some implementations, a single script can invoke the prediction API functions for multiple models. For example, a script can use one model to determine that an email message is not spam and use another model to determine the sentiment of the email message.

FIG. 1 illustrates use of the prediction API in conjunction with an example spreadsheet web application. A computer spreadsheet is an automated accounting worksheet. The spreadsheet web application 112 software executes on one or more servers in a data warehouse 108 that houses hundreds or thousands of servers. The web application 112 provides an interactive GUI 100 through a computer network 106 such as the Internet to software (e.g., a web browser) executing on a client computing device 104. The GUI 100 is displayed for a user 102 and enables the user 102 to interact with the web application 112.

The GUI 100 presents multiple cells (e.g., cells 116 and 120) in a two-dimensional matrix consisting of rows and columns. A cell is an interactive field that can accept user input such as a formula and present an output value such as alphanumeric text or a numeric value, for example. A formula defines how the content of a cell is calculated (e.g., from the contents of one or more cells in the matrix or other information). As mentioned above, a formula can invoke a script which can, in turn, invoke functionality of the prediction API to train a predictive model from data in cells or calculate the value of cells using predictions from a model. (The prediction API is described further below.)

Scripts are executed by a script engine 114. The script engine 114 is invoked by the web application 112 (or other application) when a script needs to be processed, such as in the example of a spreadsheet when the spreadsheet requires the script to be executed in order to determine the value of a spreadsheet cell. The script engine 114 is a computer program that interprets or executes scripts. In some implementations, the script engine 114 is a JAVASCRIPT interpreter. The script engine 114 can translate or compile scripts to an intermediate language or to a machine language before executing them. Other types of script engines are possible. Scripts that utilize functionality of the prediction API can communicate with one or more models 110 in order to train the models and/or invoke the models to make predictions.

By way of further illustration, cell 116 in the spreadsheet GUI 100 can have a formula which invokes the following script:

1. var ss=SpreadsheetApp.getActiveSpreadsheet( )
2. var sheet=ss.getActiveSheet( )
3. var myValue=sheet.getRange("D3").getValue( )
4. var result=predict ("Mike's Model", myValue);
5. sheet.getRange("D5").setValue(result);

The first line of the above script (written in JAVASCRIPT) creates an object "ss" that represents the active spreadsheet in a web application (i.e., the spreadsheet that currently has input focus). The second line of the script obtains a sheet object "sheet" that represents the active sheet within the active spreadsheet. Scripts reference interactive fields of graphical user interfaces by reading or writing values of the fields. The third line obtains the value (e.g., text or a number) of the D3 cell (116) from the active sheet and places it in variable "myValue". Next, in the fourth line of the script, the value of cell D3 is sent as a query to a model referred to as "Mike's Model"). A script references a model by providing an input parameter to a prediction API function that identifies the model or a location of training data for the model. The prediction of the model is placed in the "result" variable which then provides the value of spreadsheet cell D5 (120) in the fifth line of the script.

A predictive model can be expressed as a model representation to enable models to be exchanged between systems. In some implementations, the model representation can be provided in the form of a Predictive Model Markup Language (PMML) document. PMML is an eXtensible Markup Language (XML)-based language. Other model representations are also possible such as, for example, formatted or unformatted text. The PMML specification is an XML schema. Instances of models are XML documents that conform to such a schema. A PMML document can represent more than one model. Generally speaking, a PMML document can contain some or all of the information described in TABLE 3. The PMML document can also contain information not described in TABLE 3.

TABLE 3

| SECTION | DESCRIPTION |
| --- | --- |
| Header | The header contains general information about the PMML document, such as copyright information for the model, its description, and information about the application used to generate the model. |
| Data Dictionary | The data dictionary contains definitions for all the possible fields used by the model. |
| Data Transformations | The data transformations specify mappings of user data into different forms to be used by the model. |
| Model | Contains the definition of the particular model. |
| Mining Schema | The mining schema lists all fields used in the model. This can be a subset of the fields as defined in the data dictionary. It contains specific information about each field, such as the field's name and what should happened when there is a missing value. |
| Targets | Targets specify post-processing for the predicted value. |
| Output | The output provides a name any output fields expected from the model, including the predicted value. |

Figure 2:
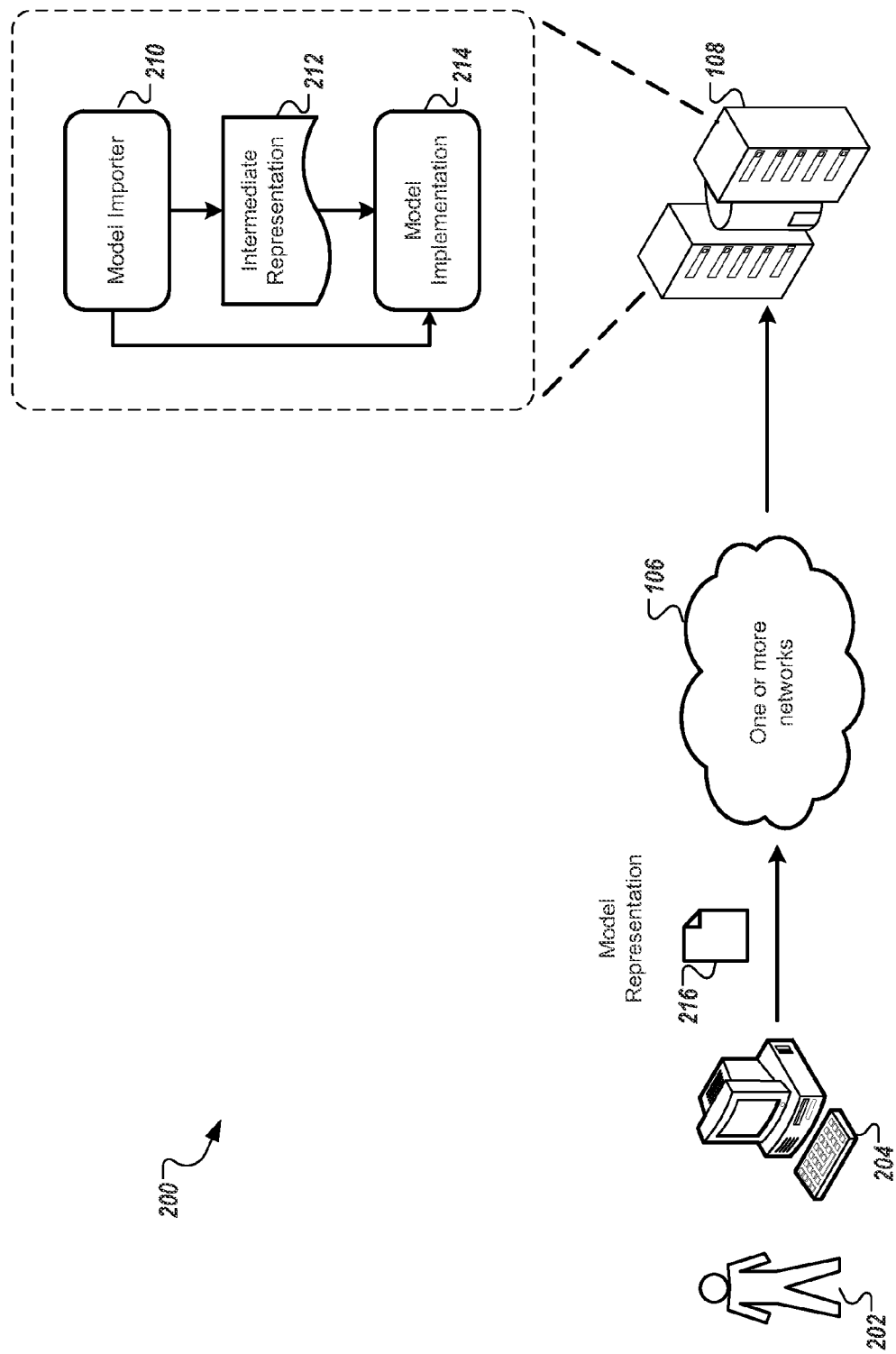
FIG. 2 illustrates the importation of a predictive model into an example system.

FIG. 2 illustrates the importation of a predictive model into an example system 200. As shown, a user 202 interacts with a client computing device 204 (or "client") to access a model importer 210 web application for importing a model representation 216. A web application executes on one or more server computing devices (or "servers") that are accessed over a network 206, such as the Internet, by the user 202. Software that implements the model importer 210 executes on one or more servers in a data warehouse 208, for instance, that houses hundreds or thousands of servers. The user 202 can interact with the model importer 210 by using a web browser or other software that executes on the client 204. User data files such as model representations (e.g., model representation 216) that are accessed, modified or created by the model importer 210 can be stored in repositories that are accessible to the servers. The model importer 210 can provide a graphical user interface (GUI) to the client 204 by sending the client 204 Hypertext Markup Language (HTML) documents or other information that can be used to render the GUI.

The model importer 210 interprets the model representation 216 and either emits an intermediate representation 212 or a model implementation 214. By way of illustration, if the model representation 216 is a PMML document, an XML parser can be used to translate the document into the intermediate representation 212. The intermediate representation 212 is an internal representation of the model representation 216 from which a model implementation 214 can be generated or selected (if the implementation has already been generated). In some implementations, the intermediate representation 212 is a data structure that encodes the information of the model representation 216 to enable for rapid generation or selection of a model implementation 214.

A model implementation 214 can be generated or selected directly from the model representation 216 or from the intermediate representation 212. The model implementation 214 is one or more computer programs that execute on one or more servers. In some implementations, the type of model implementation 214 is chosen based on the user's status, available resources, or both. This is described further below with reference to FIG. 2. For example, the model implementation can be a computer program that is designed to execute on a single server or it can be designed to execute on multiple servers. An example of the latter approach is a model implemented as a map-reduce system. A map-reduce system includes application-independent map modules configured to read input data and to apply at least one application-specific map operation to the input data to produce intermediate data values. The map operation is automatically parallelized across multiple servers. Intermediate data structures are used to store the intermediate data values. Application-independent reduce modules are configured to retrieve the intermediate data values and to apply at least one application-specific reduce operation to the intermediate data values to provide output data. The map-reduce system is described further in U.S. Pat. No. 7,650,331, entitled "System and method for efficient large-scale data processing," which is incorporated by reference herein in its entirety.

Figure 3:
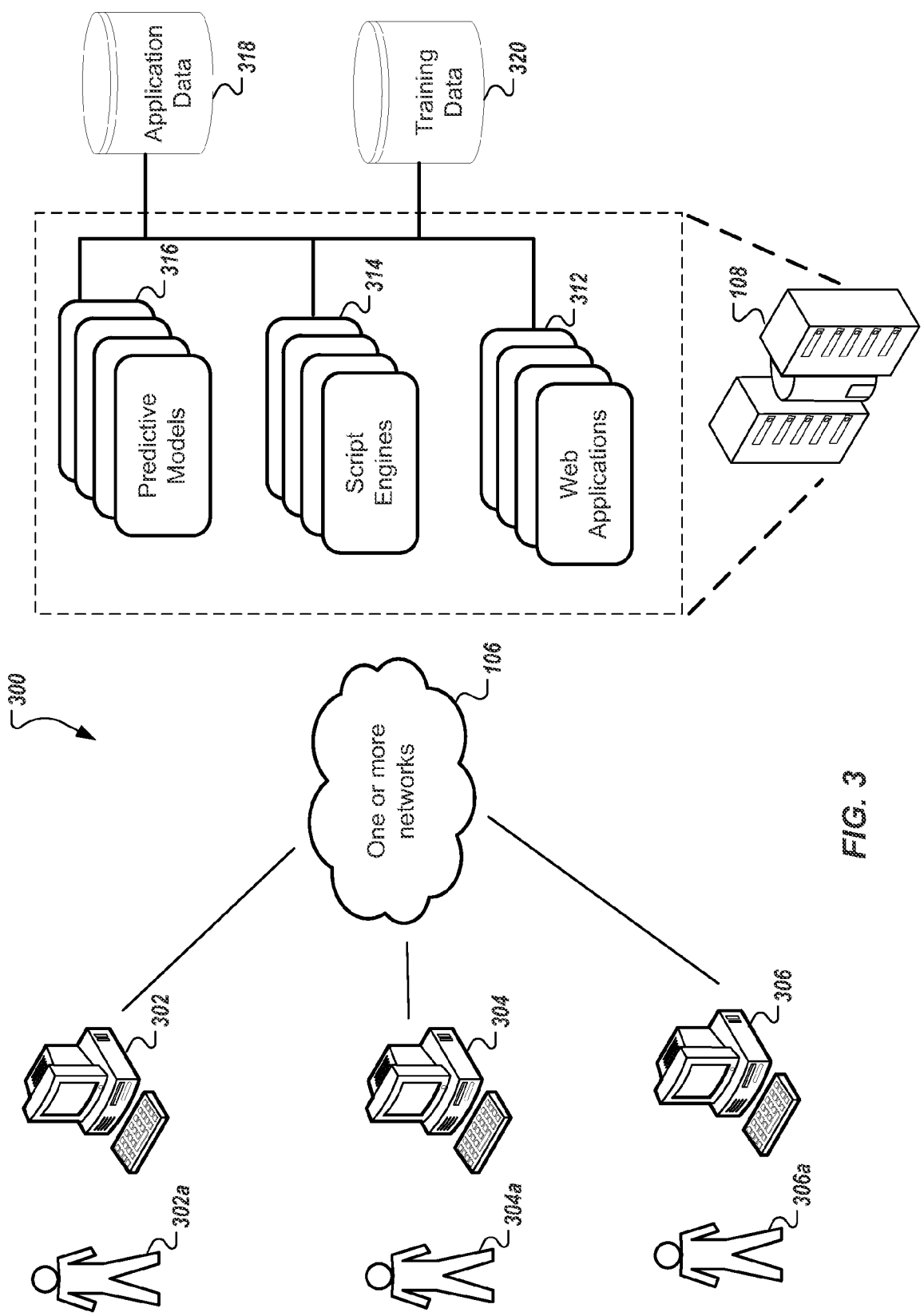
FIG. 3 illustrates an example predictive modeling system.

FIG. 3 illustrates an example predictive modeling system 300. The system includes one or more clients (clients 302, 304 and 306) that can communicate through one or more networks 308 with a collection of remote servers, such as servers deployed in a data center 310 or in different geographic locations. The servers execute computer programs that implement web applications 312, script engines 314, and predictive models 316. Web applications 312 invoke script engines 314 at various times to execute scripts. Script engines 314 enable scripts to utilize predictive models 316 for training and prediction.

A given server comprises one or more data processing apparatus. The servers can communicate with each other and with storage systems (e.g., application data storage system 318 and training data storage system 320) at various times using one or more computer networks or other communication means. For example, the servers in the data center 310 can be coupled to an intranet. A computer program can execute on a single server or, alternatively, the program can be organized into components that execute on multiple servers. There can be more than one instance or copy of a given computer program executing on the collection of servers at any given time. Multiple copies of a computer program that implements the script engine, for instance, can be executing at the same time on one or more servers providing script execution for different web applications 312. Scripts can be executed in parallel by the script engines 314. Two scripts are executed in parallel if they are executed on different servers and if at least a portion of their execution occurs at the same time. For example, assume that script A is executed by a script engine executing on server S1 and script B is executed by a script engine executing on server S2. If some period of time exists where script A and B are both being executed, then the scripts are executed in parallel.

Figure 4:
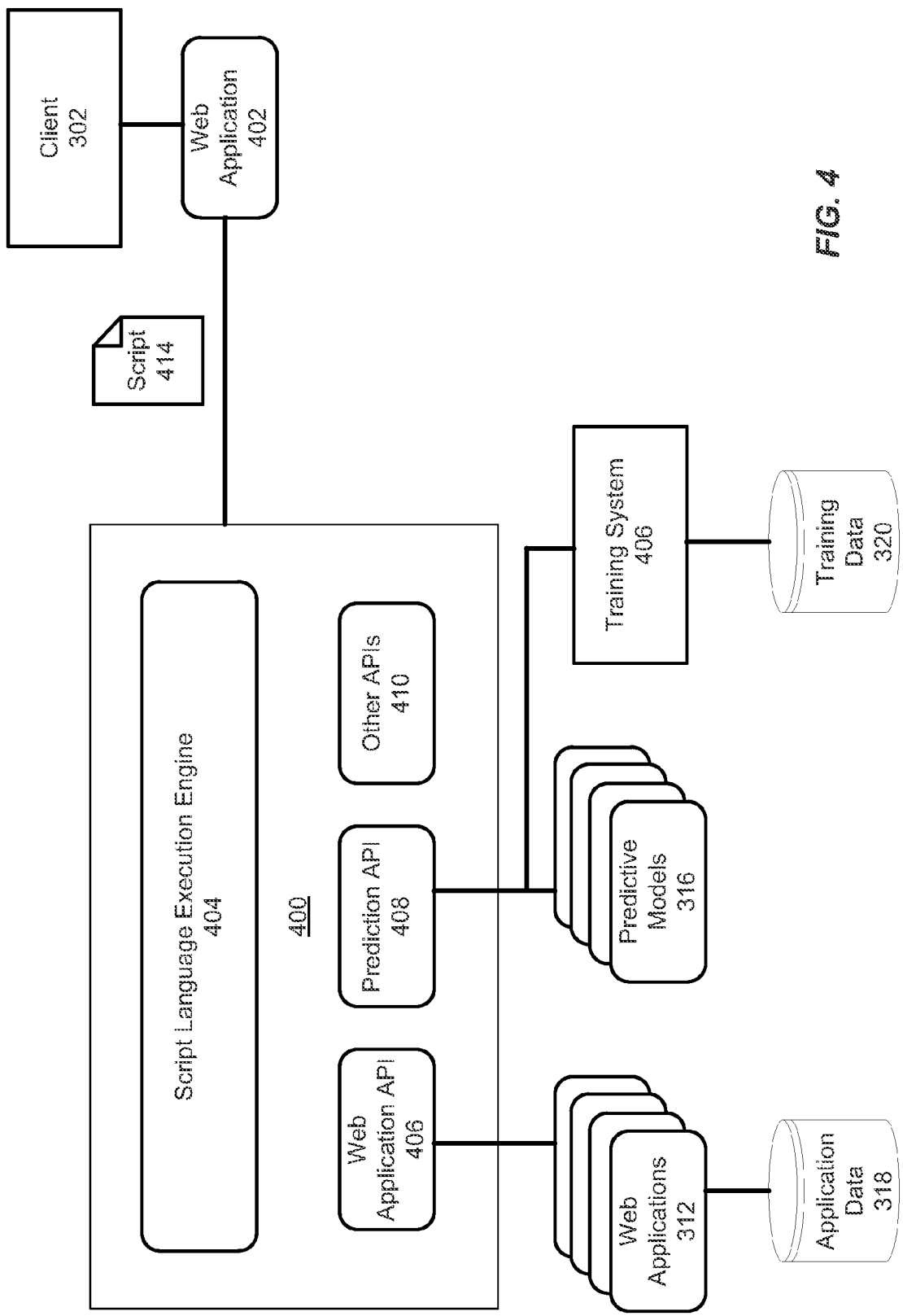
FIG. 4 illustrates an example script engine.

As an illustration, and with reference to FIG. 4, client 302 can interact with web application 402. In order to execute a script 414 the web application 402 invokes a script engine 400. The script engine 400 is a separate computer program or, in some implementations, is part of the computer program that makes up the web application 402. In either case, the script engine 400 is provided with the script (or a memory location of the script). The web application 402 and the script engine 400 can communicate through method invocation, shared memory, network communication, or other means of inter or intra-process communication. The script engine 400 includes a script language execution engine 404, a web application API 406, a prediction API 408 and, optionally, other APIs (410). Scripts can contain references to interactive fields of web applications 312 as input parameters to the web application API 406 methods. Scripts can also contain references to predictive models 316 as input parameters to the prediction API 408 functions. The script language execution engine 404 interprets or executes the script 414. In some implementations, the execution engine 404 is a JAVASCRIPT interpreter. The web application API 406 exposes functionality through objects, methods, or functions that enable scripts to utilize functionality of web applications 312 and access application data 318 such as user data files.

The prediction API 408 exposes functionality through objects, methods or functions that enable scripts to query models and train models 316 using training data obtained from application data 318. In some implementations, models are trained by a training system 416 which receives requests from the prediction API 408 to initiate training and check the status of training The prediction API 408 provides the training system 416 with the location of training data 320 to be used in training a particular model. For example, the training data, such as a range of cells in a spreadsheet, can be obtained from the application data 318 through use of the web application API 406 and then provided to the training system 416 through use of the prediction API 408.

Other APIs 410 can include, for instance, an API that enables scripts to communicate over computer networks using Transmission Control Protocol/Internet Protocol (TCP/IP) and an authentication API which provides a mechanism for authorizing a script's request to access a user's application data 318, models 316, and training data 320 through the web application API 406 and the prediction API 408. In some implementations, the web application 402 or the script engine 400 requests access permission from an authorization server. The authorization server is responsible for prompting the user (e.g., user 302a) for permission to grant access to the required data, if necessary. If permission is granted, the authorization server returns a token that can be shared with the web application 402, the web application API 406, and the prediction API 408 in order to access the required data. Other authorization mechanisms are possible.

Figure 5:
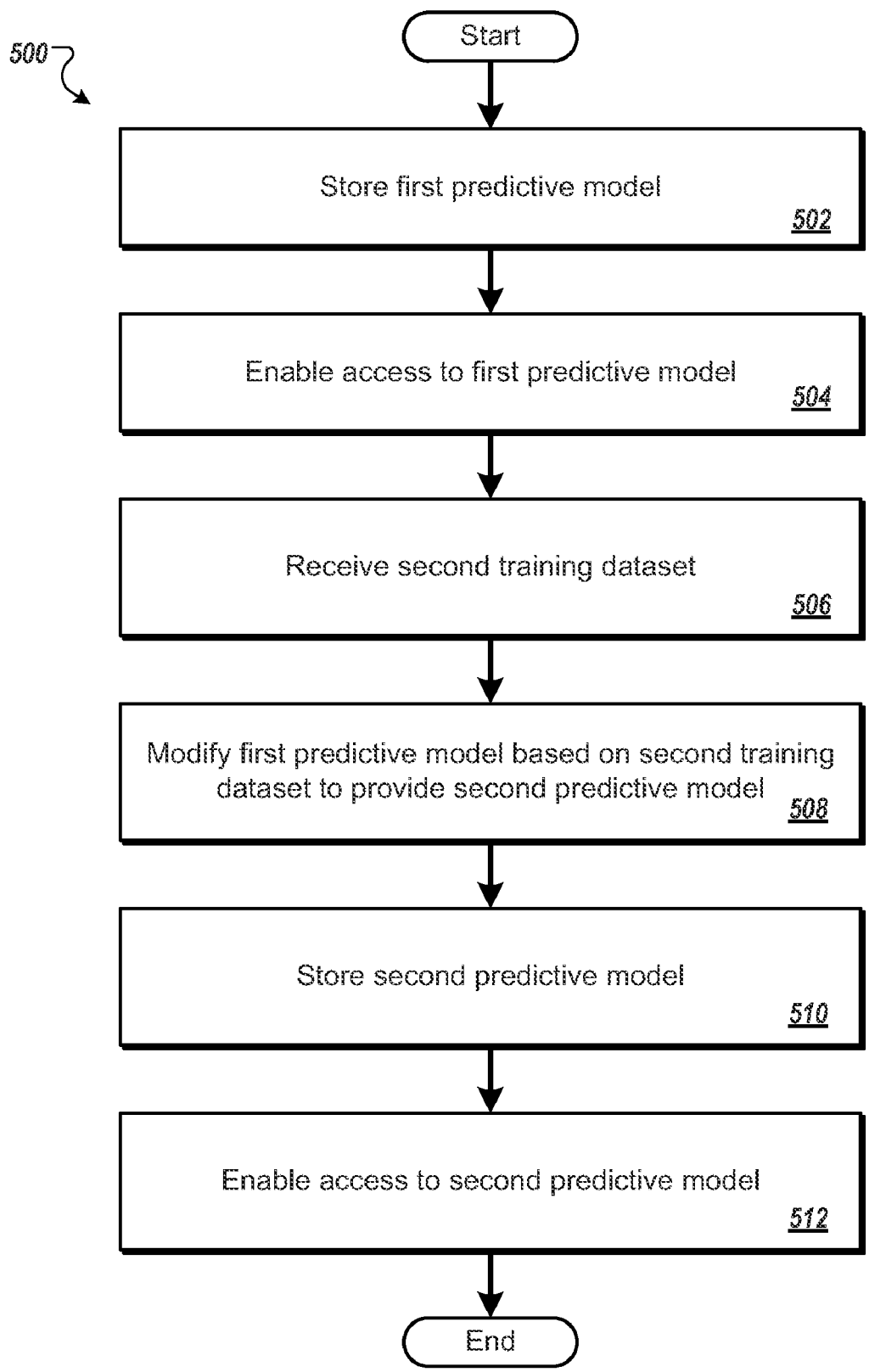
FIG. 5 is a flowchart of an example process for hosting predictive models.

FIG. 5 illustrates an example computer-implemented process 500 for hosting predictive models that can be implemented by a computing system. As shown, a first predictive model can be stored, for example in computer readable memory of a computing system (502). In some implementations, the first predictive model can be imported into the computing system by an owner. For example, an owner can submit a model representation to the computing system (for instance, in the form of a PMML document). In some implementations, the owner can submit a training dataset to the computing system and subsequently request to have a predictive model trained using the provided training data. As described above, training of a predictive model can be invoked through script enabled prediction API functions.

As shown, according to process 500, access to the first predictive model can be enabled (504). In some examples, the first predictive model can be made accessible to various users. Users accessing a predictive model can invoke prediction functions through script enabled prediction APIs. In some implementations, an owner can define permissions specifying which individual users, or groups of users can access the first predictive model. In some implementations, access to the first training dataset can be inhibited, such that the training data is inaccessible to users (in some implementations, this can even include users whom have been permitted to access the first predictive model). Thus, owners can submit predictive models for hosting without exposing proprietary or confidential data to users.

In some instances, a user can modify or update the first predictive model. For example, monitored performance of the first predictive model can be below a selected threshold or, a substantial change in the modeled process or occurrence has been detected. As such, the user can provide new training data that is more reflective of present circumstances. Therefore, according to process 500, a second training dataset can be received from a user (506). In some examples, the second training dataset is distinct from the first training dataset. For instance, the second training dataset can include at least one training example that is different from training examples of the first dataset.

The first predictive model can be modified based on the second training dataset to provide a second predictive model (508). In some examples, a copy of the first predictive model can be generated, and subsequently updated using the second training dataset. The copy can be similar or identical to the original first predicative model. As discussed above, predictive models can be embodied or implemented by suitable computer programs. Thus, in some implementations, generating a copy of the first predictive model can include producing a similar or identical computer program operable to implement an inferred function of the first predictive model. In some implementations, generating a copy of the first predictive model can include repeating the following operation (under similar or identical operating conditions): applying the first training dataset to the first machine learning algorithm. There can be several suitable methods for updating the copy of the first predictive model (see for example, those described above). As a result, a second predictive model (which can be distinct from the first predictive model) representative of both the first and second training datasets can be produced and stored, for example in computer readable memory (510). In some examples, access to the second predictive model can be enabled (512) to various users.

Figure 6:
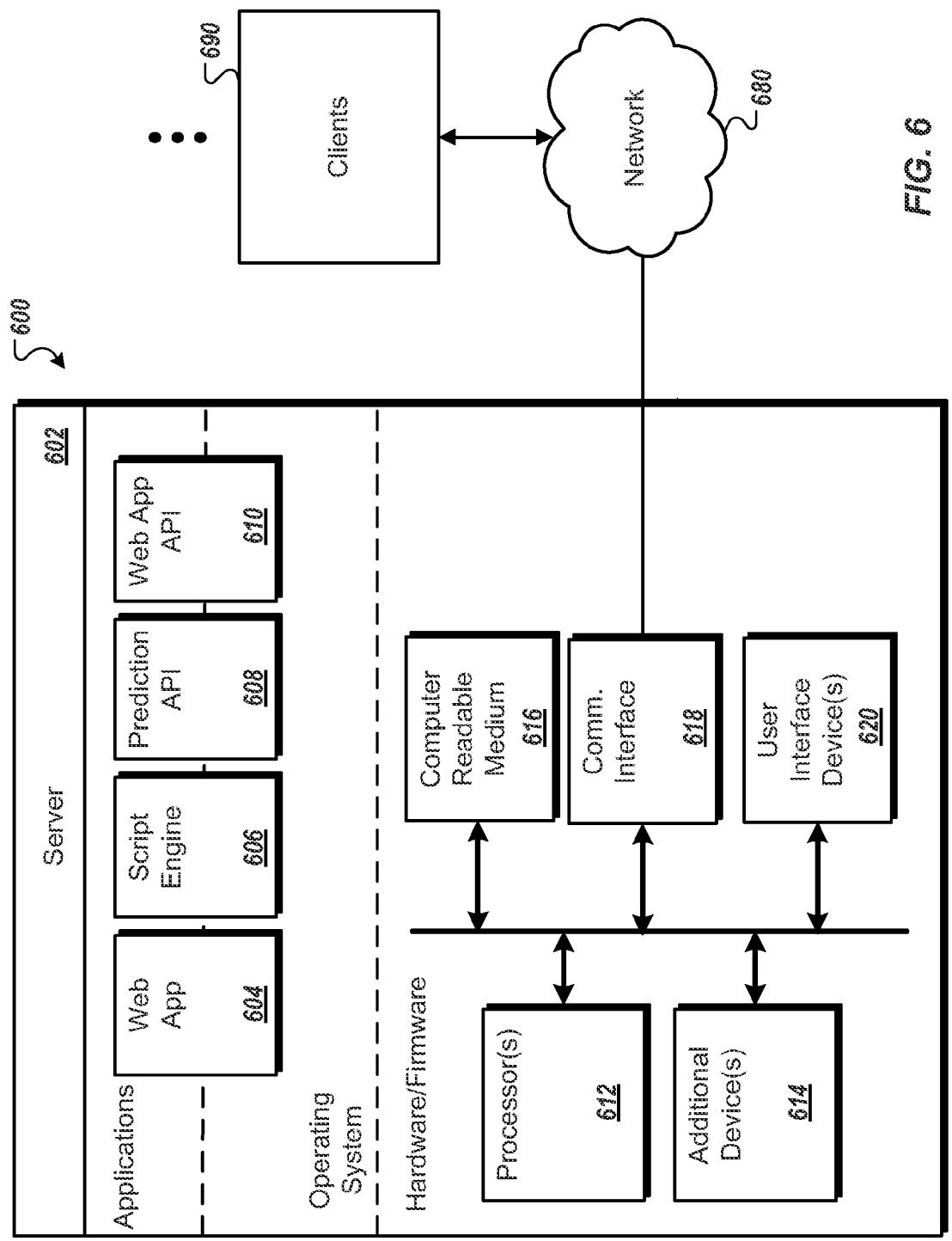
FIG. 6 is a schematic diagram of an example server.

FIG. 6 is a schematic diagram of an example server. The server 602 is optionally connected to one or more user or client computers 690 through a network 680. The server 602 consists of one or more data processing apparatuses. While only one data processing apparatus is shown in FIG. 6, multiple data processing apparatus can be used. The server 602 includes various software modules, e.g. executable software programs or libraries, including a web application 604, script engine 606, prediction API 608, and web application API 610. Although several software modules are illustrated, there can be fewer or more software modules. Moreover, the software modules can be distributed on one or more data processing apparatus connected by one or more networks or other suitable communication mediums.

The server 602 also includes hardware or firmware devices including one or more processors 612, one or more additional devices 614, a computer readable medium 616, a communication interface 618, and one or more user interface devices 620. Each processor 612 is capable of processing instructions for execution within the server 602. In some implementations, the processor 612 is a single or multi-threaded processor. Each processor 612 is capable of processing instructions stored on the computer readable medium 616 or on a storage device such as one of the additional devices 614. The server 602 uses its communication interface 618 to communicate with one or more computers 690, for example, over a network 680. Examples of user interface devices 620 include a display, a camera, a speaker, a microphone, a tactile feedback device, a keyboard, and a mouse. The server 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method, comprising:
    storing a first predictive model in computer-readable memory, the first predictive model having been defined based on a first training dataset provided by an owner of the first predictive model and being operable to generate an output based on a query;
    enabling access for a user to the first predictive model based on permissions defined by the owner, while inhibiting access for the user to the first training dataset such that the first training dataset is inaccessible to the user;
    receiving a second training dataset from the user, the second training dataset being distinct from the first training dataset;
    modifying the first predictive model based on the second training dataset to provide a second predictive model;
    storing the second predictive model in computer-readable memory; and
    enabling access for the user to the second predictive model.

2. The method of claim 1, wherein storing a first predictive model comprises receiving the first predictive model from an owner.

3. The method of claim 1, wherein storing a first predictive model comprises:
    receiving the first training dataset from an owner; and
    applying the first training dataset to a first machine learning algorithm to generate the first predictive model.

4. The method of claim 1, wherein the first training dataset comprises a first set of training examples and the second training dataset comprises a second set of training examples, the second set of training examples comprising at least one training example that is divergent from the first set of training examples.

5. The method of claim 1, further comprising modifying the second training dataset by applying one or more favoring operations on the second training dataset.

6. The method of claim 1, wherein modifying the first predictive model comprises
    generating a copy of the first predictive model; and
    updating the copy of the first predictive model.

7. The method of claim 6, wherein updating the copy of the first predictive model comprises applying the second training dataset and the copy of the first predictive model to a second machine learning algorithm.

8. The method of claim 7, wherein the first predictive model comprises an ensemble of combined predicted models, and wherein updating the copy of the first predictive model comprises:
    applying the second training dataset to a second machine learning algorithm to generate a supplementary predictive model representative of the second training dataset; and
    incorporating the supplementary predictive model into the ensemble of combined predictive models.

9. The method of claim 6, wherein updating the copy of the first predictive model comprises:
    combining the first and second training datasets to form an updated training dataset; and
    applying the updated training dataset to a second machine learning algorithm.

10. A computer storage medium encoded with a computer program, the program comprising instructions that when executed by one or more computers cause the one or more computers to perform operations comprising:
    storing a first predictive model in computer-readable memory, the first predictive model having been defined based on a first training dataset provided by an owner of the first predictive model and being operable to generate an output based on a query;
    enabling access for a user to the first predictive model based on permissions defined by the owner, while inhibiting access for the user to the first training dataset such that the first training dataset is inaccessible to the user;
    receiving a second training dataset from the user, the second training dataset being distinct from the first training dataset;
    modifying the first predictive model based on the second training dataset to provide a second predictive model;
    storing the second predictive model in computer-readable memory; and
    enabling access for the user to the second predictive model.

11. A system, comprising:
    one or more computing devices; and
    one or more computer-readable media coupled to the one or more computing devices and having instructions stored thereon which, when executed by the one or more computing devices, cause the one or more computing devices to perform operations comprising:
        storing a first predictive model in computer-readable memory, the first predictive model having been defined based on a first training dataset provided by an owner of the first predictive model and being operable to generate an output based on a query;
        enabling access for a user to the first predictive model based on permissions defined by the owner, while inhibiting access for the user to the first training dataset such that the first training dataset is inaccessible to the user;
        receiving a second training dataset from the user, the second training dataset being distinct from the first training dataset;
        modifying the first predictive model based on the second training dataset to provide a second predictive model;
        storing the second predictive model in computer-readable memory; and
        enabling access for the user to the second predictive model.

12. The method of claim 1, wherein modifying the first predictive model comprises:
- receiving an instruction from the user through an application programming interface (API); and
- modifying the first predictive model in response to the instruction.

13. The method of claim 6, wherein updating the copy of the first predictive model comprises modifying one or more hyper-parameters associated with the first predictive model.

14. The method of claim 8, incorporating the supplementary predictive model into the ensemble of combined predictive models comprises combining output from the supplementary predictive model with output from the ensemble of predictive models using a combining rule.

15. The method of claim 14, wherein combining output from the supplementary predictive model with output from the ensemble of predictive models comprises at least one of weighting or devaluing output from the supplementary predictive model.

16. The method of claim 2, wherein receiving the first predictive model from an owner comprises receiving a model representation of the first predictive model in the form of a Predictive Model Markup Language (PMML) document.

17. The computer storage medium of claim 10, further comprising modifying the second training dataset by applying one or more favoring operations on the second training dataset.

18. The computer storage medium of claim 10, wherein modifying the first predictive model comprises
- generating a copy of the first predictive model; and
- updating the copy of the first predictive model.

19. The system of claim 11, further comprising modifying the second training dataset by applying one or more favoring operations on the second training dataset.

20. The system of claim 11, wherein modifying the first predictive model comprises
- generating a copy of the first predictive model; and
- updating the copy of the first predictive model.

* * * * *